United States Patent [19]

Lever

[11] Patent Number: 4,684,282
[45] Date of Patent: Aug. 4, 1987

[54] STRUCTURAL ELEMENT FOR THREE DIMENSIONAL OBJECTS, E.G. FURNITURE

[76] Inventor: Robert J. A. B. Lever, Veerstraat 2, Schoonhoven, Netherlands

[21] Appl. No.: 673,427

[22] Filed: Nov. 20, 1984

[51] Int. Cl.[4] .............................................. F16D 1/00
[52] U.S. Cl. ..................................... 403/219; 403/382; 403/231
[58] Field of Search ............... 403/219, 382, 231, 401, 403/402

[56] References Cited

U.S. PATENT DOCUMENTS

| 1,847,925 | 3/1932 | Carter | 403/401 X |
| 4,216,255 | 8/1980 | Lever | 403/231 X |
| 4,383,780 | 5/1983 | Davison | 403/219 |

FOREIGN PATENT DOCUMENTS

| 705711 | 5/1941 | Fed. Rep. of Germany | 403/219 |
| 28019 | 4/1956 | Finland | 403/219 |
| 170517 | 9/1934 | Switzerland | 403/401 |

Primary Examiner—Andrew V. Kundrat

[57] ABSTRACT

An elongated structural member is erected with one or more similarly formed members. The ends are formed with a pair of angularly disposed chamfers each at a predetermined angle with the longitudinal axis, and having a tenon projection and a corresponding mortise. The tenon and mortise are disposed relative to each other in a respective one of said chambers, at right angles to each other, such that on joining said elements the tenons of one element fit within the mortise of the other element and the chamfered ends abut each other.

5 Claims, 9 Drawing Figures

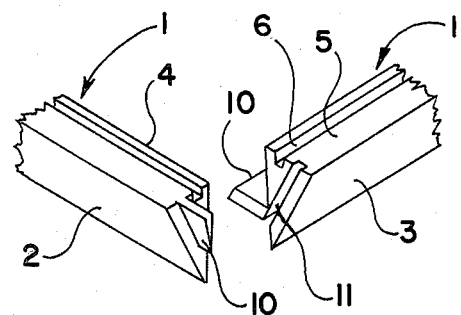
FIG. 1
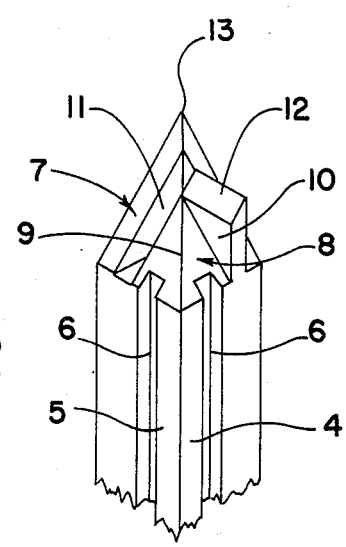
FIG. 2
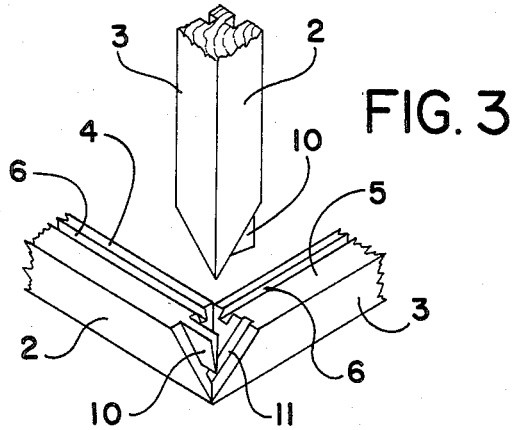
FIG. 3
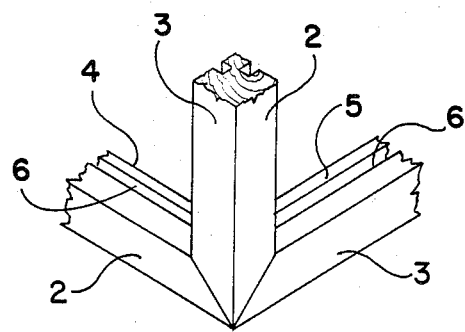
FIG. 4
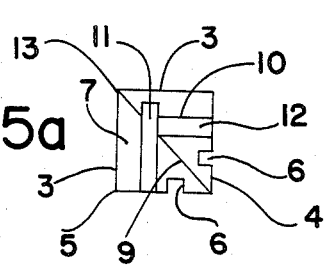
FIG. 5a
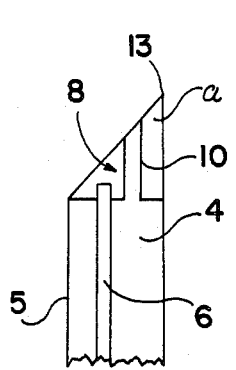 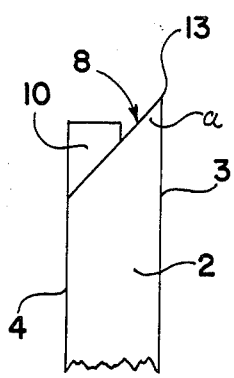 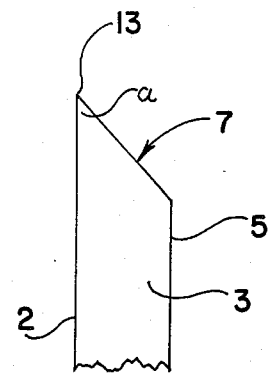
FIG. 5b   FIG. 5c   FIG. 5d   FIG. 5e

STRUCTURAL ELEMENT FOR THREE DIMENSIONAL OBJECTS, E.G. FURNITURE

BACKGROUND OF THE INVENTION

The invention relates to a structural element for erecting three-dimensional objects, e.g. furniture, tables, frames and the like.

Three-dimensional objects such as cases, cabinets, tables, chairs and so on, comprising shaped uprights and horizontal members are known in which longitudinal elements, i.e., sections, are joined at their ends to form the object. Usually, different types of sections are used for different objects. The cross-sectional shape of the section as well as the thicknesses may differ for each object. If for the connection of the sections, tenon and mortise joints are used, the tenons and the mortises may have different shapes and dimensions. One such arrangement is shown in my earlier U.S. Pat. No. 4,216,255 dated Aug. 5, 1980.

The present invention aims at offering a simplification in this respect by proposing that for all uprights and horizontal members the same type of longitudinal section may be used. The sections may be made available to the market in a series of standard lengths, e.g. with mutual differences in length of 5 centimeters.

This object is obtained according to the invention in that the longitudinal section is formed having a square or a rectangular cross section, of which at least one end in some instances and preferably both ends are chamfered, at its joining end with another of the elements, at a predetermined angle with the longitudinal axis of the section such that the chamfering angles of two sections to be joined to each other, which sections are in the same plane after the connection of the sections, are mutually equal, and in each of the chamfered ends at least one tenon projection and at least one corresponding mortise for receiving the tenon projection, are provided.

DESCRIPTION OF THE DRAWINGS

FIG. 1 shows in perspective the ends to be joined of two identical structural sections in the position in which they may be mutually engaged by sliding;

FIG. 2 shows an end view in perspective on the joining end of section;

FIG. 3 is a perspective view of the ends to be joined of three sections;

FIG. 4 is a view of the same sections as seen on the free end of a leg;

FIG. 5a is a top plan view of the section of FIG. 2;

FIG. 5b is a side elevational view taken in the direction of one side of the structure of FIG. 2;

FIG. 5c is a view similar to FIG. 5b with the section rotated counter clockwise 90 degrees;

FIG. 5d is a view similar to FIG. 5c with the section rotated counter clockwise 90 degrees; and FIG. 5e is a view similar to FIG. 5d with the section rotated counter clockwise 90 degrees.

DESCRIPTION OF THE INVENTION

As seen in FIGS. 1 and 2, each structural section generally depicted by the numeral 1 has a pair of perpendicular disposed outer surfaces 2 and 3 and a pair of perpendicularly disposed inner surfaces 4 and 5 which together form a square cross-sectional shape. The outer surfaces 2 and 3 are plain or finished with an appropriate decorative design. The inner surface may be similarly finished, but they may, as seen, be provided with an elongated groove 6 into which a panel or the like may be fit.

At least one end of each structural section is formed with two chambered surfaces 7 and 8 diverging at 45 degrees from each other, from the central line 9. The chamfered surface 7 is further set at an angle to the inner side 5 while surface 8 is set at an angle to the surface 4. The chamfer is at a predetermined angle a (to the longitudinal axis as seen in FIG. 5) and inwardly from the outer surfaces. A tenon projection 10 running perpendicular to the outer side wall 3 and a mortise 11 running perpendicular to the tenon 10 but parallel to the outer wall 3 are formed in respective ones of the diverging chamfer surfaces 8 and 7 so that the tenon 10 and mortise 11 lie perpendicular to each other, and equally spaced from their respective adjacent outer walls 2 and 3. The tenon 10 has an upper end 12 chamfered to match the slope of the chamfered surface 7. The shape and dimensions of the mortise 11 correspond with those of the tenon 10; the tenon 10 and mortise 11 at each end being disposed oppositely with respect to each other so that a similar formed element may be made to fit one in the other as seen in FIG. 1.

The chamfering angle a of the section is shown in the embodiment as 45 degrees, but, may also have different values. As seen in FIGS. 2 and 3, the length of the tenons 10 has been kept somewhat shorter than the original length of the section which is defined at the end by the apex 13. This is accomplished by setting the tenon 10 inwardly from the outer wall 2 in order to obtain the coincidence of the vertex 13 of the chamfer angle of all three structural elements so as to form a corner joint in which the grain ends of the tenons 10 will not be visible. Thereby selective corners are obtained as shown in FIGS. 3 and 4. Therefore, also the longitudinal ends 12 of the tenons 10 have been chamfered according to the predetermined angle so that they comprise an oblique surface.

In FIG. 3 of the drawings, a two-dimensional structural assembly is shown having two structural sections 1 set perpendicular to each other to define a right angle prior to the connection of three sections into a T-shape wherein three right angles are defined. FIG. 4 shows a complete three-dimensional assembly of three sections 1.

The assembly shown in FIG. 4 can be used as a table base frame for a rectangular table, employing four such assemblies of three sections as shown with corresponding vertical sections of equal length and with horizontal members of different length, however, the lengths thereof being equal in opposite pairs. The structural sections are all identical in structure, only the length may be different. The assembly may also be used to make cabinets, etc. in the same manner with the use of panels, doors, etc. secured in grooves 6.

Variations and modifications of the present invention will be obvious to those skilled in the art and it is intended to cover in the appended claims all such modifications and equivalents as fall within the true spirit and scope of this invention.

I claim:

1. A structural element for erecting, with one or more similarly formed elements, three dimensional objects comprising an elongated member having an end of rectangular section being joined along said end angularly to another elongated member formed similarly at at least one end, said joining ends being each formed with a pair of angularly disposed chamfers each at a predetermined angle with the longitudinal axis, and having a tenon projection and a corresponding mortise, the tenon and mortise being disposed relative to each other each in a respective one of said chamfers, at right angles to each other, such that on joining said elements the tenons of one element fit within the mortise of the other element and the chamfered ends abut each other.

2. The structural element according to claim 1, wherein said predetermined angle is equal to 45 degrees.

3. The structural element according to claim 1, wherein the tenons terminate short of the longitudinal extent of the section.

4. The structural element according to claim 1, wherein each element is a solid elongated member having said rectangular cross section configured as a square.

5. The structural element according to claim 1, wherein the tenon is parallel to one wall the the mortise is parallel to another wall.

* * * * *